July 12, 1966   L. I. MENDELSOHN   3,260,931
DIAMAGNETIC GAUSSMETER
Filed Dec. 30, 1964   2 Sheets-Sheet 1

INVENTOR
LEWIS I. MENDELSOHN
BY, W.J. Shanley Jr.
ATTORNEY

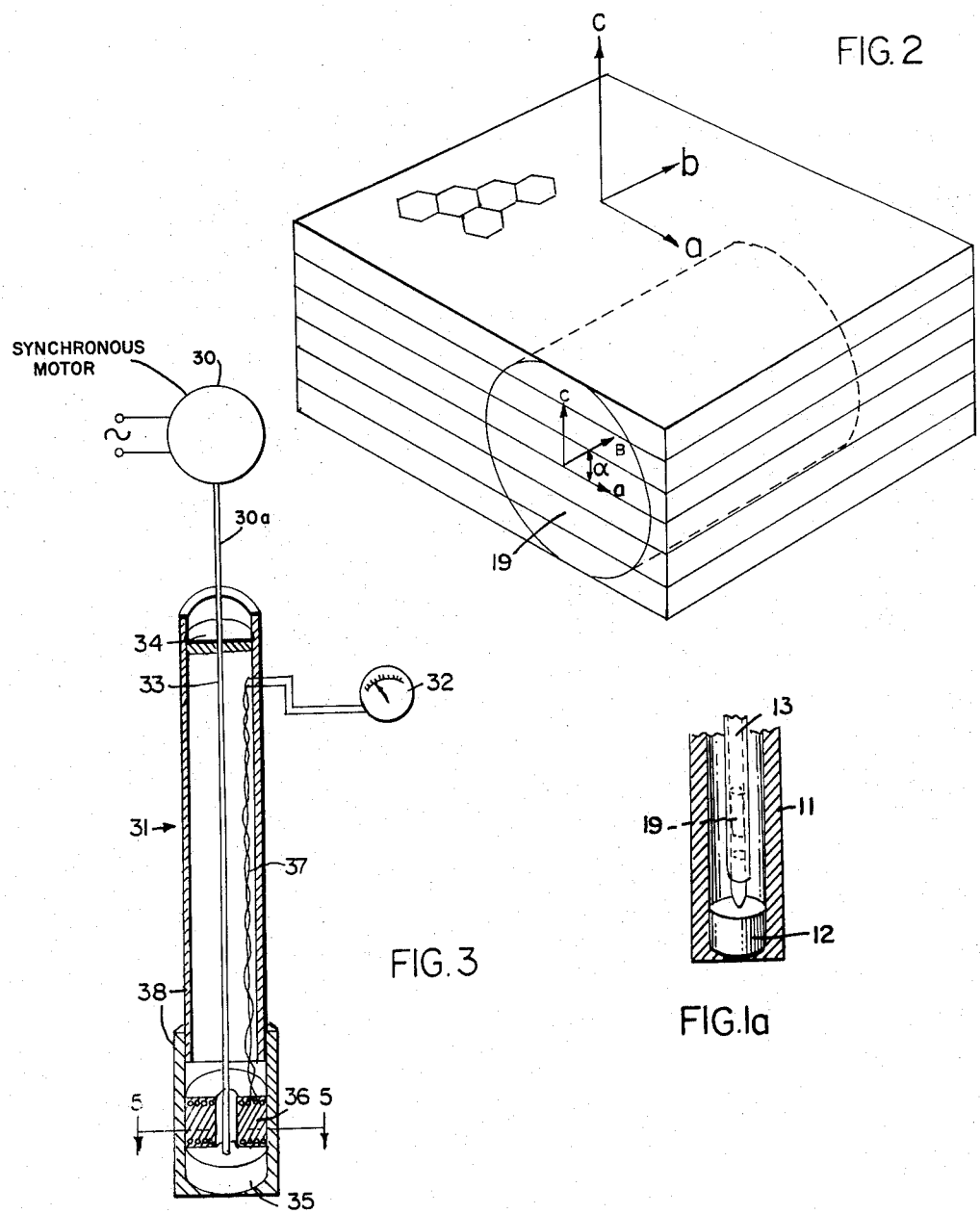

United States Patent Office
3,260,931
Patented July 12, 1966

3,260,931
DIAMAGNETIC GAUSSMETER
Lewis I. Mendelsohn, Swampscott, Mass., assignor to General Electric Company, a corporation of New York
Filed Dec. 30, 1964, Ser. No. 422,177
8 Claims. (Cl. 324—43)

This invention relates to gaussmeters and more particularly to gaussmeters which are capable of measuring fields of higher intensity than heretofore possible.

The measurement of extremely high field strengths, i.e., above 20 kilogauss, has become more important because of magnetohydrodynamics and cryogenic research directed to high field intensity superconductors. One prior art instrument capable of measuring fields of up to 20 kilogauss utilizes the torque-magnetometer principles. This instrument, which is disclosed in my United States Letters Patent 2,588,143, March 4, 1952, and assigned to the same assignee, depends upon the development of torques utilizing shape anisotropy and crystal anisotropy of a ferromagnetic material. This permitted the measurement of fields above 6,300 gauss, which was about the limit of instruments depending upon remanent magnetization. However, this instrument, which depends upon crystal anisotropy of a ferromagnetic material, is limited to measuring fields up to 20 kilogauss because this is about the upper limit for ferromagnetic materials.

It is therefore an object of this invention to provide a new and improved gaussmeter capable of measuring field strengths in excess of 20 kilogauss.

It is another object of this invention to provide a new and improved gaussmeter of the torque-magnetometer type which will measure field strengths in excess of 20 kilogauss.

These and other objects and advantages of my invention will become apparent as this description proceeds with reference to the accompanying drawings in which:

FIGURE 1a is an enlarged sectional representation of the lower end of the probe portion of the instrument of FIGURE 1;

FIGURE 2 illustrates the manner of constructing the anisotropic rotor of my gaussmeter from a strip of diamagnetic material;

FIGURE 3 is a perspective sectional view of another embodiment of a gaussmeter embodying my invention;

Figure 1:
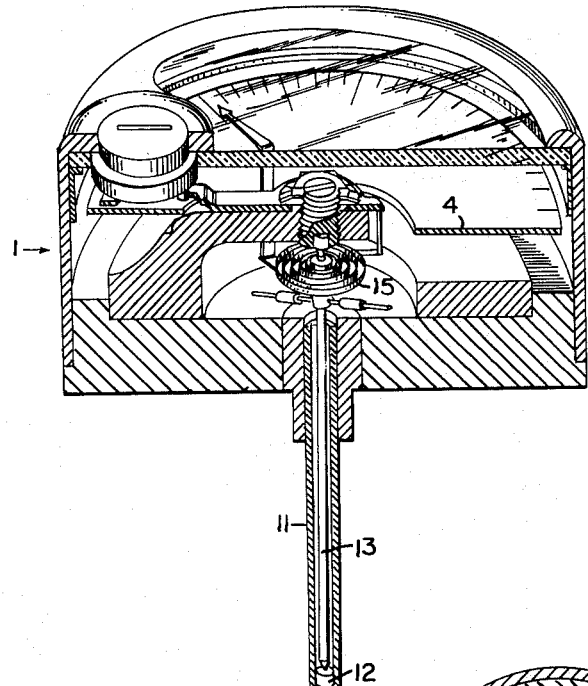
FIGURE 1 is a perspective sectional view through a gaussmeter embodying my invention.

In carrying out my invention, I make use of the directional or anisotropic properties of a diamagnetic material. Diamagnetic materials are characterized by their negative magnetic susceptibility and consequently have a permeability less than unity. This is the result of an internal magnetization which is generated so as to oppose the magnetizing force. Thus, the placing of a diamagnetic material at a particular location in a magnetic field will result in a lesser number of lines of flux passing through the location in question after this material is so located.

In accordance with my invention, the utilization of those diamagnetic materials which have anisotropic properties permits the construction of a gaussmeter which not only can measure fields above 20 kilogauss but can do so with increasing accuracy due to the fact that the torque developed with such a rotor is proportional to the square of the applied field. Thus, contrary to the prior art devices that evidence a saturation curve at the upper limits of their measuring capabilities, an instrument in accordance with my invention has a progressively more open scale at its upper end.

It is another feature of this invention to provide a gaussmeter of extreme simplicity which will provide an A.-C. voltage signal the value of which is proportional to the applied field. This signal may be amplified and/or rectified and applied to a conventional instrument to indicate magnetic field strength.

In accordance with my invention, I make use of the highly directional or anisotropic properties of pyrolytic graphite, which is a diamagnetic material.

Referring now to FIGURE 2, the diamagnetic susceptibility of pyrolytic graphite measured parallel to the $a$–$b$ planes is $-0.5 \times 10^{-6}$ e.m.u. per gram; measured perpendicular to the $a$–$b$ planes, its diamagnetic susceptibility is $-21.5 \times 10^{-6}$ e.m.u. per gram. Thus, the material is less diamagnetic (more permeable) in directions parallel to the $a$–$b$ planes than it is along the "$c$" axis. A cylindrical rotor 19 machined out of a piece of this material in a manner shown in FIGURE 2 has highly directional diamagnetic properties. If placed in a magnetic field, rotor 19 will develop torque and tend to line up with the applied field at right angles to the "$c$" axis, i.e., in alignment with the "$a$" or anisotropic axis.

The magnitude of the torque developed as a function of field strength can be determined in accordance with the following analysis. In general vector terms we know that $$T = M \times B$$

where

T is the torque in dyne-cms.

M is the rotor's magnetic moment in e.m.u. having components $Ma$, $Mb$ and $Mc$ about the $a$, $b$ and $c$ axes respectively.

B is the internal field in the rotor in gauss which, for all practical purposes, is equal to the applied field having components $Ba$, $Bb$ and $Bc$. (See W. H. Hayt, Jr., Engineering Electromagnetics, New York, 1958, p 222.)

The torque about the $b$ axis, namely $T_b$, can be written $$T_b = M_c B_a - M_a B_c \qquad (2)$$

now $$M_c = K_1 B_c V \qquad (3)$$

and $$M_a = K_2 B_a V \qquad (4)$$

where $K_1$ is the volume susceptibility along the $c$ axis in e.m.u./cm.$^3$ and $K_2$ is the volume susceptibility along the $a$ axis in e.m.u./cm.$^3$ and V is the rotor volume in cms.$^3$ from FIGURE 2

$$B_c = B \cos \alpha \qquad (5)$$

and $$B_a = B \sin \alpha \qquad (6)$$

If we substitute 3, 4, 5, and 6 into Equation 2, we get $$T_b = (K_1 - K_2) V B^2 \frac{\sin 2\alpha}{2} \qquad (7)$$

We can achieve a physical feeling for the origin of this classical torque by associating the following concepts with FIGURE 2. Here, the flux component B cos α reacts with the planes of atoms, i.e., planes $a$–$b$, to generate current loops in the planes $a$–$b$. These currents are in the proper direction to create an M.M.F. opposite to that associated with B cos α. Thus, the torque stems from the interaction of the field B with these current loops.

When rotor 19 is placed within the lower end of shaft 13 of probe 11 of the instrument of FIGURE 1 in the position illustrated more clearly in FIGURE 1a so that axis "b" coincides with the axis of rotation of shaft 13, the rotor will try to turn shaft 13 until axis "a" is in alignment with the applied field. Reference may be had to my prior patent for a more detailed discussion of the construction of the instrument of FIGURE 1 and its manner of operation. It suffices here to say that if probe 11 is placed in a magnetic field which is generally crosswise to shaft 13, rotor 19 will develop a torque in attempting to align axis "a" with the magnetic field. This torque will be resisted by spiral spring 15. The torque will be developed even though the rotor does not exhibit any magnet polarity preference; that is, it will attempt to align itself with the field with the head of arrow "a" pointing toward either the positive or negative pole of such field.

Probe 11, shaft 13, and bearing assembly 12 should be of nonmagnetic material; and when the instrument is to be used for measuring alternating fluxes, these parts should also be made of a non-conducting material or one in which the conductivity is so high that eddy current losses are negligible.

When instrument 1 is turned about its axis so that rotor 19 is turned relative to the direction of the field, a torque resisting turning develops and becomes a maximum at 45°. Turning the rotor further, the torque decreases and becomes zero again when the field is in the direction of the "c" axis. Turning the rotor further from 90° toward 180°, the torque reverses directions and then assumes a maximum value at 135° and then decreases to zero at 180°. Rotation of the rotor through an additional 180° to make a complete revolution develops the same torque curve as in the first 180° of revolution. This illustrates that the rotor exhibits no magnetic polarity preference. This anisotropic torque, as distinguished from a magnetic remanent torque that might develop due to polarization of a ferromagnetic core, depends upon induced magnetization and is independent of past, present, and/or future magnetic history of the material.

An examination of Equation 7 shows that the anisotropy torque developed is proportional to the volume of the rotor, the square of the flux density, and the volume susceptibility.

A cylindrical rotor 0.045 inch in diameter and 0.220 inch long was tested as a gaussmeter rotor in a gaussmeter of the configuration of FIGURE 1. It developed 36.0 dyne-cms. of torque in a 15 kilogauss field and 50.6 dyne-cms. in an 18 kilogauss field. The anisotropy constants for good crystals of natural Ceylon graphite have been measured as follows: $K_1$ is reported as $$-21.5 \times 10^{-6}$$

e.m.u. per gram ($-48.3 \times 10^{-6}$ e.m.u. per cm.$^3$) and $K_2$ as $-0.5 \times 10^{-6}$ e.m.u. per gram ($-1.13 \times 10^{-6}$ e.m.u. per cm.$^3$). Using these susceptibility values, we can calculate the crest rotor torque from Equation 7 assuming a 15 kilogauss field as being 31.4 dyne-cms. as compared with a measured value of 36.0 dyne-cms. The fact that the measured torque is 13% greater than the calculated torque is probably attributable to the difference between the anisotropy constants of natural crystals versus the constants of pyrolytic graphite.

In these types of systems, since the maximum torque is linearly proportional to the maximum deflection of spiral spring 15, instrument scale 4 can be calibrated in terms of this crest torque value which has been demonstrated to be proportional to the square of the applied field.

Figure 4:
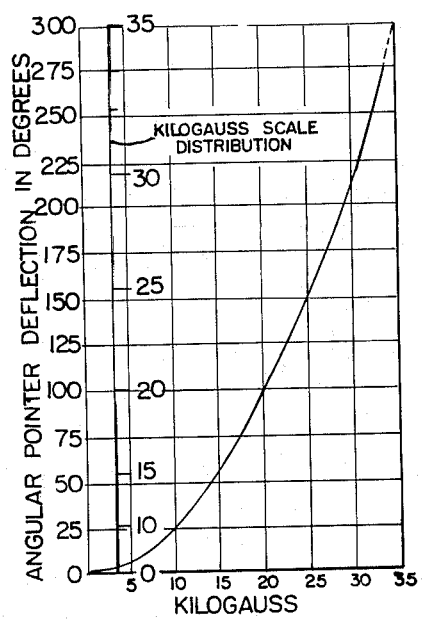
FIGURE 4 is a plot of the angular pointer deflection and scale distribution versus kilogauss.

Referring now to FIGURE 4, the scale distribution of the instrument of FIGURE 1 may be seen as a function of the applied field. Measurements were made in D.C. flux densities up to approximately 35 kilogauss. Reference to FIGURE 4 will demonstrate the advantage of the diamagnetic rotor over the ferromagnetic rotor for high fields which is attributable to the fact that the torque associated with diamagnetic anisotropy increases as a squared function of the applied field rather than exhibiting a saturation effect as is the case with ferromagnetic anisotropy. This leads to the difference between the expanded scale obtainable in accordance with my invention over that obtainable when utilizing a ferromagnetic rotor.

It is thus an important feature of this invention that a torque-magnetometer type of gaussmeter is provided which is capable of measuring fields 7 kilogauss and above with increasing accuracy.

It is another important feature of this invention that the anisotropy torque developed varies in a predictable manner with temperature variations from 90° K. to 1270° K. provided that the oxidation of the graphite is minimized at the elevated temperatures. A protective atmosphere can be utilized to accomplish this, if necessary.

It is another important feature of this invention that anisotropic diamagnetic materials do not exhibit a polarization torque which would add to or subtract from the anisotropic torque as is the case with anisotropic ferromagnetic materials. Therefore, a gaussmeter may be utilized for undirectional field measurements throughout its entire range of operation.

Referring now to FIGURE 3, there is illustrated a gaussmeter for generating an A.-C. signal the magnitude of which is proportional to the applied magnetic field.

This embodiment is illustrated as comprising a synchronous motor 30, probe 31, and A.-C. meter 32 for indicating the magnitude of the A.-C. signal developed. As will hereinafter be pointed out, since the A.-C. signal developed by probe 31 is proportional to the field intensity, meter 32 may be directly calibrated in terms of the magnetic field being sensed.

Rotor 30a of synchronous motor 30 is coupled to shaft 33 the upper end of which is journaled in bearing 34 while the lower end of shaft 33 may be rotatably supported in any convenient manner by lower bearing member 35. The lower end of shaft 33 provides means for supporting internally a diamagnetic rotor made of anisotropic material in the same manner as hereinbefore explained with respect to FIGURE 1a for rotation about its b axis. Of course, it will be recognized that it is not necessary to incorporate the rotor within the supporting shaft since a rotor of larger diameter than shaft 33 may be supported thereon for rotation within the magnetic field.

Figure 5:
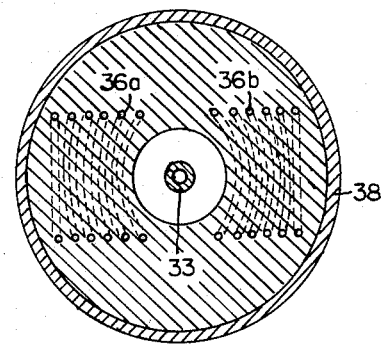
FIGURE 5 is a sectional view taken along lines 5—5 of FIGURE 3.

Means is provided by coil 36 for sensing the variations in the magnetic field applied perpendicular to shaft 33 in response to the rotation of the anisotropic diamagnetic material. Variations are produced as the a and c axes of the anisotropic diamagnetic material alternately align with the magnetic field. The varying magnetic field causes a change in the flux linking coil 36 to thereby produce an A.-C. signal in coil 36. Referring now to FIGURE 5, coil 36 is illustrated as being comprised of two sections 36a and 36b which are connected in series-aiding relationship to a twisted pair of conductors 37 which provide means for applying the A.-C. signal to meter 32. Probe housing member 38 may be conveniently divided into an upper and a lower section to facilitate the assembly and location of bearing member 35 and coil 36 in the lower end of the housing. These two sections may then be joined together in any convenient manner.

It will thus be appreciated that, in accordance with the embodiment of FIGURES 3 and 5, I have provided a gaussmeter which generates A.-C. signals proportional to the magnetic field being sensed. These A.-C. signals may be amplified, rectified, or their magnitude may be directly indicated depending upon the operational requirements.

While particular embodiments of the invention have been illustrated and described, various changes and modifications therein may be made by one skilled in the art.

Therefore, it is intended in the appended claims to cover all such changes and modifications as fall within the true spirit and scope of the invention.

What I claim as new and desire to secure by Letters Patent of the United States is:

1. In a gaussmeter having a rotatably supported shaft, the improvement comprising a shaft including a portion made from an anisotropic diamagnetic material having its anisotropic axis at right angles to the axis of rotation of said shaft.

2. In a gaussmeter having a rotatably supported shaft, the improvement comprising a shaft including a portion made from pyrolytic graphite, the anisotropic axis of said portion being at right angles to the axis of rotation of said shaft.

3. An anisotropic rotor for a gaussmeter comprising a cylindrical piece of pyrolytic graphite for rotation about its cylindrical axis, the anisotropic axis of said cylindrical piece being at right angles to said cylindrical axis.

4. A gaussmeter comprising a rotatably supported shaft, said shaft including a portion made from an anisotropic diamagnetic material having its anisotropic axis at right angles to the axis of rotation of said shaft, a stationary pick-up coil positioned to be magnetically linked to said portion and the field to be measured, means for rotating said portion at a constant speed upon said axis of rotation, and terminal means for connection to said stationary pick-up coil.

5. The combination of claim 4 further comprising means connected to said terminal means for measuring the signal developed in said stationary pick-up coil.

6. The combination of claim 5 in which said anisotropic diamagnetic material is pyrolytic graphite.

7. The combination of claim 6 in which said piece of pyrolytic graphite is cylindrical in shape and is positioned so that its axis coincides with said axis of rotation.

8. The combination of claim 7 in which said rotating means comprises a synchronous motor connected to rotate said shaft.

References Cited by the Applicant

UNITED STATES PATENTS

| | | |
|---|---|---|
| 2,485,931 | 10/1949 | Slonczewski. |
| 2,652,533 | 9/1953 | Lush. |
| 2,757,335 | 7/1956 | Bellugue. |
| 3,012,177 | 12/1961 | Mortimer. |

RICHARD B. WILKINSON, *Primary Examiner.*